United States Patent

Marciandi et al.

Patent Number: 6,103,789
Date of Patent: Aug. 15, 2000

[54] HYDROSOLUBLE ACRYLIC COPOLYMERS

[75] Inventors: Franco Marciandi, Milan, Italy; Christian Collette, Paris, France

[73] Assignee: Elf Atomchem Italia S.r.l., Milan, Italy

[21] Appl. No.: 09/362,573

[22] Filed: Jul. 28, 1999

[30] Foreign Application Priority Data

Jul. 31, 1998 [IT] Italy .................................. MI98A1793

[51] Int. Cl.$^7$ .............................. C04B 7/00; C08F 2/38; C08F 4/42; C08F 20/02

[52] U.S. Cl. ................................. 524/5; 524/650; 526/84; 526/85; 526/126; 526/318.41; 526/318.42

[58] Field of Search ................................... 524/4, 5, 650; 526/84, 85, 126, 318.41, 318.42

[56] References Cited

FOREIGN PATENT DOCUMENTS

| | | |
|---|---|---|
| 0 405 818 A2 | 1/1991 | European Pat. Off. . |
| 0 612 702 A1 | 8/1994 | European Pat. Off. . |
| 0 753 488 A2 | 1/1997 | European Pat. Off. . |
| 94 08913 | 4/1994 | WIPO . |

*Primary Examiner*—Peter A. Szekely
*Attorney, Agent, or Firm*—Arent, Fox Kintner Plotkin & Kahn

[57] ABSTRACT

Acrylic copolymers containing the following repeating units:

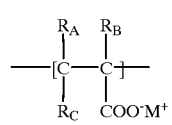

(I)

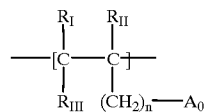

(II)

wherein $R_A$, $R_B$, $R_C$, $R_I$, $R_{II}$, equal or different, are H or $CH_3$; $M^+$ is H or a cation belonging to group IA, IIA, or ammonium; n is an integer from 0 to 2; $A_0$ is $-COO-(R_TO)_m-R_Z$ wherein $R_T$ is a saturated $C_2-C_4$ alkyl group, m is an integer from 7 to 50, $R_Z$ is H or a saturated $C_1-C_4$ alkyl group; $R_{III}$ is H, COOH, $COO^-M^+$ wherein $M^+$ is as above defined or $A_0$ as above defined; and optionally containing a third comonomer in a quantity 0–20% of the total monomer weight, said polymers, that contain in terminal position silanol groups, are obtainable by copolymerizing the monomers in the presence of the following chain transfer agents:

(A) $SH-R_o-Si(R_{IB})_{NB}(OR_{IA})_{NA}$, wherein $R_{IA}$ is hydrogen or a saturated $C_1-C_3$ alkyl, $R_{IB}$ is $C_1-C_3$ alkyl, NB is an integer and is 1 or zero, NA is an integer and is 2 or 3, $R_o$ is a linear or branched alkylenic chain from 1 to 20 carbon atoms, or a mixture of (A) with (B) phosphorous$^{I-III}$ inorganic acids or their salts.

15 Claims, No Drawings

HYDROSOLUBLE ACRYLIC COPOLYMERS

The present invention relates to compounds and compositions thereof, showing an improved combination of properties.

The use of fluidifying agents for cement aqueous slurries is known in the art. Said compounds are defined as agents able to reduce significantly the slurry viscosity for prolonged times, so that it is possible to use the cement slurry also after some hours, at least two hours after its preparation.

The patent WO 94/08913 describes the use of polymers comprising at least an alkylenaminophosphonic group and a polyoxyalkylenic chain, and thereof salts, as fluidifying agents of aqueous suspensions of mineral particles and of hydraulic binder pastes. Tests carried out by the Applicant have shown that commercially available products based on said compounds are active as cement fluidifying agents only at high concentrations, at least 0.5% by weight.

European patent 753,488 concerns a cement fluidifying agent of the polycarboxylic polymer type, obtained by copolymerizing (a) a mono(meth)acrylic (alkoxy) polyalkylenglycol ester with (b) (meth)acrylic acid, optionally in the presence of a third monomer (c) being an acrylic acid derivative. The polymerization is carried out in the presence of a chain transfer agent. In said patent low molecular weight alcohols or aliphatic carboxylic acids containing in the molecule a thiol group are disclosed as transfer agents. Tests carried out by the Applicant have pointed out that the cement slurries containing these polymers have not very good rheological and mechanical properties.

The patent WO 98/28353 describes the use of polymers containing carboxyl groups and polyalkylene oxide ether side chains as additives in mineral building materials. Said polymers are preferably constituted of methacrylic acid and methylpolyethylenglycol methacrylate containing from 10 to 60 ethylene oxide units. The monomers are polymerized in the presence of a phosphorous-containing compound, organic or inorganic, in amounts from 0.1 to 50% by weight referred to the monomers to be polymerized. Preferably, polymerization occurs in the presence of a chain transfer agent containing an —SH group, such as mercaptopropionic acid and mercaptoethanol. The Applicant has shown by experiments that the polymers obtained according to said patent, even in the presence of the therein mentioned —SH chain transfer agents, are not satisfactory since in the minislump test (see below) after 8 hours the rheological properties decrease.

The need was felt to have available fluidifying additives of cement aqueous slurries having improved properties in comparison to those of the prior art.

The Applicant has unexpectedly and surprisingly found fluidifying additives of cement aqueous slurries showing improved properties compared with those of the prior art. More in particular, the new additives can also be used at concentrations at which the conventional fluidifying agents do not influence significantly the cement slurry rheological properties or the mechanical properties of the obtained cement. The additives of the present invention allow to increase the cement slurry fluidity and to maintain its viscosity for prolonged times, at least two hours; further they can be used also at concentrations lower than those of the prior art.

An object of the present invention are hydrosoluble acrylic copolymers, having weight average molecular weight in the range 5,000–80,000, determined as the value corresponding to the maximum of the elution peak (GPC determination), containing in the molecule the following repeating units:

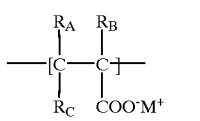
(I)

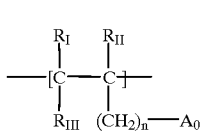
(II)

wherein:

the molar ratio between the unit (I) and unit (II) in the polymer ranges from 1:1 to 50:1;

in unit (I) $R_A$, $R_B$, $R_C$, equal or different, are H or $CH_3$; $M^+$ is H or a cation belonging to the IA, IIA group, or ammonium;

in unit (II) $R_I$, $R_{II}$, equal or different, are H or $CH_3$; n is an integer from 0 to 2, $A_0$ is —COO—$(R_TO)_m$—$R_Z$ wherein $R_T$ is a saturated alkyl group having from two to four carbon atoms, m is an integer from 7 to 50, $R_Z$ is an hydrogen atom or a saturated alkyl group from 1 to 4 carbon atoms;

$R_{III}$ is H, COOH, COO$^-$M$^+$ wherein M$^+$ is as above defined or $A_0$ as above defined;

optionally containing from 0 to 20%, on the total monomer weight, of repeating units from one or more of the following monomers:

(meth)acrylic ester of $C_1$–$C_{20}$ aliphatic alcohols;

polyethoxymonoallyl alkylethers of formula $CH_2$=$CHCH_2O(C_2H_4O)_p$—R wherein p is comprised between 5 and 50 and R is $C_1$–$C_4$ alkyl.

aliphatic $C_3$–$C_5$ monounsaturated sulfonic acids.

compounds of formula

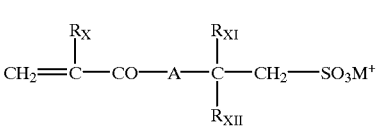
(V)

wherein:
M$^+$ is as above defined,
$R_X$ is H or $CH_3$,
$R_{XI}$ and $R_{XII}$ are, independently each from the other H or $C_1$–$C_8$ alkyl,
A is NH or N—$CH_3$,
said hydrosoluble acrylic polymers contain at the chain ends silanol groups, and are obtainable by copolymerizing the above monomers in the presence of chain transfer agents selected from the following:

(A), wherein
$R_{IA}$ is hydrogen or a saturated $C_1$–$C_3$ alkyl, $R_{IB}$ is $C_1$–$C_3$ alkyl, NB is an integer and is zero or 1, NA is an integer and is 2 or 3, with the condition that NA+NB=3, $R_o$ is a linear alkylenic chain, or branched when possible, containing a number nx of carbon atoms from 1 to 20, preferably from 2 to 7, optionally containing polar groups bound to the chain directly, or through $(CH_2)_{nx}$ groups, wherein nx has the above indicated meaning;

a mixture made from compound (A) as above defined with phosphorous inorganic acid/s or its/their salt/s (compound (B)), wherein the phosphorous has an oxidation number varying from I to III (phosphorous$^{I-III}$), said phosphorous inorganic acid preferably selected from $H_3PO_2$ or $H_3PO_3$ or mixtures thereof;

the cations of the salts of phosphorous$^{I-III}$ inorganic acids are selected from alkaline, earth-alkaline metals or ammonium ions.

$R_o$ of compound (A) can contain polar groups bound to the chain directly, or through $(CH_2)_{nx}$ bridges wherein nx is as above defined. Said polar groups are, for instance, —COOH or the corresponding alkaline metal salts; —COO—$(R_TO)_m$—$R_Z$ in which $R_T$, m, $R_Z$ have the above mentioned meaning; —O—$(R_TO)_m$—$R_Z$; —N($R_{Z'}$)$R_Z$ wherein $R_{Z'}$, equal or different from $R_Z$, has the same meaning of $R_Z$; or —CO—N($R_{Z'}$)$R_Z$; —$SO_3H$ or its alkaline metal salts. Preferably in compound (A) $R_o$ is a linear alkylenic chain, or branched when possible, from 1 to 20 carbon atoms, preferably from 2 to 7 carbon atoms. Preferably (A) is the following compound: SH—$CH_2$—$CH_2$—$CH_2$—Si($OR_{IA}$)$_3$, wherein $R_{IA}$ is as above defined.

The copolymers having weight average molecular weight in the range 8,000–50,000 and a molar ratio between unit (I) and unit (II) in the range 2:1–20:1, are those preferred.

The monomers contained in the preferred copolymers are monomers (I) and (II), wherein in (I) $R_A=R_C=H$, $R_B=H$, $CH_3$; in (II) $R_I=H$, $R_{II}=H$, $CH_3$, $R_{III}=H$, n=0; in $A_O$ $R_T$=saturated alkyl group having two or three carbon atoms, m is in the range 10–45; $R_Z=CH_3$.

The copolymers according to the present invention are prepared by a polymerization process similar to those described in the art, for instance E.P. 405,818 and 612,702, both herein incorporated by reference.

The polymerization is carried out in water batchwise or in semicontinuous or continuous way, by using as initiators water soluble compounds such as for instance ammonium or alkaline salts of persulphuric acids, (i.e. persulphates or perdisulphates), of perphosphoric acids, or hydrogen peroxide, or organic peroxides such as tert-butyl hydroperoxide; in the presence of polymerization accelerators, such as compounds as sodium bisulphite, amines, etc., and of chain transfer agents selected among the compounds of formula (A), or mixtures of said compounds with compounds (B).

The compounds of formula (A) are used in molar ratios to the polymer monomers in the range 1:5–1:80, preferably 1:10–1:50; when mixtures of chain transfer agents (A) and (B) are used, the molar ratios to the monomers of each of the chain transfer agent in the mixture of (A)+(B), vary within the following limits, from: (A) 1:5 and (B) 1:40, to: (A) 1:80 and (B) 1:2.5.

The monomers are soluble in the reaction mixture and the obtained polymer usually gives clear solutions in water at room temperature. The acid carboxylic groups of the chain can be neutralized with alkali either partially, for instance for at least 20% on a molar basis, or totally; the alkaline agent used for the partial or total neutralization is soluble in water. NaOH, KOH, etc. can be used. The alkali can be added at the beginning, or during, or at the end of the polymerization reaction.

The solid concentration in the polymerization ranges from 25 to 60% by weight, preferably from 30 to 50% by weight on the overall aqueous solution; the temperatures are in the range 50–120° C., preferably 75–100° C., the reaction time is comprised between 0.5 and 8 hours, preferably between 2 and 4 hours.

Before adding the reactants, into the reactor can be poured a water aliquot. The reactants can be co-fed at a constant flow rate, under stirring. Separately, can be added the initiator and optionally the alkali solution needed for the partial or total acid neutralization.

In alternative, the reaction can be performed batchwise, and the monomers and the other reagents are mixed together before the start of polymerization.

The transfer agents (A) or the mixture (A)+(B), besides reducing the polymer molecular weight, introduce into the chain ends of the polymer a silicon atom bound to one or more hydroxyl groups (silanol) as from the following formula:

$$—Si(R_{IB})_{NB}(OH)_{NA} \qquad (VI)$$

wherein $R_{IB}$, NB and NA are as above defined.

The hydroxyl groups of formula (VI) derives from the hydrolysis of $OR_{IA}$ of formula (A).

The Applicant has surprisingly found that when said silanol groups are distributed along the polymer backbone (e.g. by using an unsaturated monomer containing silanol groups or groups that by hydrolysis give a silanol group) but not at the chain end, the polymers thus obtained are less effective as cement fluidifying agents.

The Applicant has also found that the amount of silicon added as chain transfer agent during the polymerization is found in the final polymer. Thus it is demonstrated that the polymer of the invention contains in terminal position the above silanol groups.

Without being bound to any theory, the Applicant could explain the improved properties of the polymers of the present invention, over those of the prior art, by the fact that said hydroxyl groups in end position linked to a silicon atom, are more polar than those linked to a carbon atom and thus said ends endow the polymer of a dispersing power and fluidifying properties in the cement slurry greater than those of the prior art polymers. See the Tables. Owing to the presence of these specific terminal ends the cement particles should remain for a longer time in a deflocculation state and cement particle flocculation is prevented.

It has been surprisingly found that when the silane derivatives of formula (A) are admixed with phosphorous$^{I-III}$ inorganic acid/s or its/their salt/s (compound (B)), a synergism takes place and the dispersing effect increases. It is thus possible to reduce the quantity of the silane derivative used without affecting the rheological properties of the cement slurry. It must be noted that in said mixtures compound (B) is added in a quantity, calculated as molar ratio on the overall monomer content, at which it does not have any dispersing effect if used alone, without compound (A).

When the polymers of the invention are added to aqueous cement slurries, they improve both the mixing and dispersion of the cementitious mass, and improve also thereof rheological properties of the cement mass, as said above. On a same concentration basis said polymers are better fluidifying agents than those of the art (see the examples).

More in particular, by using in the polymerization process component (A) in the above indicated molar ratios to the polymer monomers, are obtained copolymers having cement fluidifying properties superior even to those copolymers obtained by using as chain transfer agent thiols containing in the molecule a different functional group from alkoxysilane, such as mercaptopropionic acid or mercaptoethansulphonic acid. See the results in the examples obtained in the tests performed by the Applicant.

By using in polymerization as chain transfer agents a mixture of (A) and (B), it is possible to reduce the quantity of component (A) used in polymerization and obtain polymers having the same fluifying properties.

The aqueous mixtures of the slurries or pastes comprising cement and the copolymers of the invention, contain a copolymer amount, expressed as percentage by weight on the cement on a dry weight basis, in the range 0.05–20%, preferably 0.1–0.5%.

The addition of the copolymers of the invention to the above mentioned aqueous slurries or pastes is made by mixing with said slurries or pastes the polymer as such, or the corresponding aqueous solution, the polymer amount being such that the ratio by weight polymer/cement on a dry weight basis is within the above mentioned limits; the mixture is then left under stirring until the mass becomes homogeneous.

When the polymer solution is added to a cement slurry or to a cement paste, the water volume used to prepare said slurry or paste is preferably decreased of the corresponding amount of water contained in the polymer solution, in order to maintain the same water/cement ratio.

The compositions formed by mixing aqueous cement slurries or pastes with the copolymers of the invention can contain conventional additives such as deaerating, antifoaming, thickening agents, retardants and inert materials of suitable granulometry. All the cement types available in commerce can be used, optionally added of the above mentioned additives.

The fluidifying polymers of the invention allow to reduce the cement aqueous slurry viscosity for at least two hours, as requested for a cement fluidifying agent. Unexpectedly the present invention polymers allow to reduce the slurry viscosity also when added in very low amounts (e.g. 0.2%): it is to be noted that the fluidifying agents of the art at the same quantites are uneffective or less effective (see the examples).

The following examples illustrate the invention and are not limitative of the same.

EXAMPLE 1

Characterization

EXAMPLE 1A

Slump Test with the Abrams Minicone

It is used a mortar having the following composition:
siliceous sand having the following granulometry (determination according to NFP 18-560):
  from 0 to 1 mm: 913 g,
  from 1 to 2 mm: 165 g,
  from 2 to 4 mm: 272 g,
  for a total of 1350 g.
Cement 1 42.5 CP2 HEMING®: 509.5 g.
Water/cement ratio in the mortar: a sufficient amount is used to obtain on spreading a mortar cake of 250±15 mm diameter.
Amount added of the invention polymers in the mortar: from 0.175% to 0.525% by weight on a dry basis in relation to the cement amount. To the mortar is added an amount by weight of the polymer solution equivalent to a polymer amount on a dry weight basis comprised in the above mentioned limits.
Antifoam agent: 0.5% by weight.
The Abrams minicone used in the tests has the following dimensions: height 150 mm; base diameter 100 mm, upper face diameter 50 mm.

In a container by means of a mechanical stirrer, the container and stirrer having shape and dimensions in compliance with EN 196-1 par. 4.4 (August 1995 Ed.), water is admixed with the polymer and the cement for 30 seconds; sand is added and mixing is continued for other 30 seconds at a rate of 60 rpm. Subsequently mixing is effected for further 30 seconds at a 120 rpm rate. The slurry is allowed to rest for one minute and 30 seconds, and then mixing is resumed for 1 minute at 120 rpm.

The Abrams minicone, previously placed on a 350×350 mm PVC sheet, is filled with three layers of slurry of the same heigth compacting each layer, before adding the following one, by repeatedly dipping for 25 times a metal bar having a 8 mm diameter. At exactly two minutes from the end of the last mixing operation the cone is lifted, and after 30 seconds from the cone lifting the diameter in millimeters of the cake formed on the PVC sheet is measured.

EXAMPLE 1B

Compression-Resistance Test

On a slurry prepared according to example 1A the compression-resistance test according to the EN 196-1 method (August 1995 Ed.), par. 9.3, was determined.

EXAMPLE 1C

Absolute Viscosity Determination

The viscosity was determined at 30 rpm (spindle No. 2) with a Brookfield LVT2 viscosimeter at the temperature of 20° C.

EXAMPLE 1D

Molecular Weights (M.W.) Determination by GPC

In a 1 M $NH_4OH$ aqueous solution, containing $NaN_3$ at a 0.02% w/v concentration, the polymer is dissolved at a 1% (w/v) concentration (40 mg/4 ml). The GPC equipment is formed by a Constometric® 3200 pump, a Rheodyne® 7125 valve, a Differential Refractometer R 401® detector, PW 2000–3000–4000 TSK gel® columns connected in series and thermostatted at 40° C., and a Spectra Physics® integrator.

The columns are calibrated with polyethylenglycols with molecular weight in the range 3400–35000 (weight average average molecular weight). 200 μl of the sample solution are injected, by using as reference dioxane having a 1% (w/v) concentration in water.

The polymer molecular weight value is determined in correspondence of the maximum of the elution peak.

EXAMPLE 1E

"Minislump" Test

By means of an Erweka AR 400 mixer the following cement composition is prepared:

| | | |
|---|---|---|
| Portland CPA-CEMI 42.5 cement | g | 625 |
| Normalized sand EN 196-1 (par. 5.1.2) | g | 1350 |
| MILLISIL ® SA 4 silica (Sibelco Italiana) | g | 50 |
| water (water/cement ratio 0.42) | g | 261 |
| quantity (g) of 35% w/w polymer solution (0.175% w/w polymer/cement) | g. | 3,2 |

If the polymer concentration is different than 35%, the quantity of solution added to the cement is suitably modified so that the ratio polymer/cement is that above given (0.175%). When different ratios have been used, they have been expressly indicated in the following examples and tables. The difference in water content is compensated by adjusting the total quantity of water, in order to maintain the requested ratio water/cement.

Preliminarily the polymer solution is diluted with an aliquot (5–10 cc) of the total water amount to be used. In the container water is poured (251–256 ml) and under mechanical stirring (20 rpm) is added, in the order, cement together with the silica, then portionwise the sand and at the end the solution of the polymers of the invention.

One continues for 1 minute at the same speed, and for another minute at 30 rpm. Stirring is then stopped by pouring the homogeneous mass in a brass cone-shaped frustum, open in correspondence of the two flat surfaces, having a 40 mm heigth, upper surface diameter 70 mm and base diameter 80 mm, placed on a PVC sheet. The container must be filled from the base up to the brim. The slurry excess is removed with a paddle. Two tests are carried out:

1. The cone frustum is filled and after 1 minute the content is poured on the sheet by lifting upwardly the cone frustum;
2. the cone frustum is filled a second time with the same slurry left at rest for 30 minutes, and handly remixed before the test, repeating the procedure of point 1.

After 30 seconds from the cone frustum removal the diameter in cm of the obtained cake is determined.

The relevant data given in the Tables have been obtained with said procedure. However in some tests, as expressely indicated both in the examples and in the tables, the cement slurry or paste have been assayed after 2, 4, 6 and 8 hours from the preparation of the slurry or paste, in order to follow the variation with time of the starting rheological properties of the slurry. The slurry or paste was thoroughly mixed before being poured in the cone frustrum.

The greater is the mixture fluidity, the greater the cake diameter obtained.

Each of the figures reported in the following tables is the average of three separate determinations, performed preparing each time the above given slurry composition.

EXAMPLE 2

Preparation of a Copolymer Having M.W. 22,500 by Polymerization of Methoxypolyethylenglycol Methacrylate (MPEGMA) with Methacrylic Acid (AMA) (AMA/MPEGMA Molar Ratio 2.8/1) and Mercaptopropyl-trimetoxysilane as Chain Transfer Agent (Prep. DIC. 54)

In a 1 liter glass reactor, with heating jacket connected to a thermostatic bath, equipped witht thermocouple, stirrer, metering pump, dropping funnel, pipe for the nitrogen flow and condenser, 317 g of deionized water are introduced and heated under nitrogen flow up to a temperature of 80–85° C. After reaching this temperature, in the time of three hours, are added:

by means of a metering pump, an aqueous mixture formed by adding to 528 g of a 50% water solution of methoxypoly ethylenglycol methacrylate (MPEGMA) mol. weight (M.W.) 1080, 59 g of methacrylic acid (AMA) (AMA/MPEGMA 2.8:1 molar ratio) and 5.7 g of mercaptopropyl-trimethoxysilane (silane/monomers 1/32 molar ratio), by a dropping funnel, 32.3 g of a 10% (w/w) solution of ammonium persulphate $(NH_4)_2S_2O_8$.

After three hours, the reaction is completed by adding, in a single portion 8 g of a 10% w/w $(NH_4)_2S_2O_8$ solution and maintaining the temperature at 80° C. for a time of 45 minutes. The reaction mixture, after cooling, appears as an homogeneous solution. The solution has a dry residue of 35% by weight and viscosity of 70 cps. The polymer molecular weight, determined by GPC, is of 22,500.

On a cement slurry prepared as in Ex. 1A the compression-resistance test was performed; on a cement slurry obtained as described in Ex. 1E the Minislump test was carried out. The results of said tests are reported in Tables 2 and 3.

EXAMPLE 3

Preparation of a Copolymer Having M.W. 14,500 by Polymerization of Methoxypolyethylenglycol Methacrylate (MPEGMA) with Methacrylic Acid (AMA) (AMA/MPEGMA Ratio 2.8/1 Ratio) by Using as Chain Transfer Agent a Mixture of Mercaptopropyl-trimethoxysilane (Molar Ratio to Monomers 1:50) and Sodium Hypophosphite (Molar Ratio to Monomers 1:20) (Prep. DIC. 61)

In a 10 liter glass reactor, equipped as described for the reactor of Example 2, 3700 g of deionized water are introduced. It is heated at 80° C. as described in Example 2. In a three hours time are added:

by a metering pump, 6060 g of an aqueous mixture at 50% in water of methoxypolyethylenglycol methacrylate of Example 2, 675 g of methacrylic acid (AMA/MPEGMA 2.8:1 molar ratio), 41 g of mercaptopropyl-trimethoxysilane and 56 g of sodium hypophosphite (silane/monomers molar ratio 1/50; phosphite/monomers molar ratio 1/20), by a dropping funnel, 371 g of a 10% (w/w) solution of $(NH_4)_2S_2O_8$.

The reaction is completed by adding at the end, in a single portion, 92 g of a 10% solution of ammonium persulphate and allowing to react for one hour at 80° C. The obtained solution has a dry residue of 35% and a viscosity of 70 cps. The polymer molecular weight, determined by GPC, is 14,500.

On a cement slurry prepared as in Ex. 1A the compression-resistance Test was performed; on a cement slurry obtained as described in Ex. 1E the Minislump test was carried out. The results are reported in Tables 1, 2 and 4.

EXAMPLE 4

Preparation of a Polymer Having M.W. 10,000 by Polymerization of Methoxypolyethylenglycol Methacrylate with Methacrylic Acid (AMA/MPEGMA Ratio 4/1) by Using as Chain Transfer Agent Mercaptopropyl-trimethoxysilane (Prep. DIC. 60)

The equipment described in Example 2 is charged with 404 g of deionized water, which is heated to 80° C. as described in Example 2. In a three hours time are added:

by a metering pump, a mixture consisting of 236.4 g of methoxypolyethylenglycol methacrylate having M.W. 628, 236.4 g of deionized water and 129.0 g of methacrylic acid (AMA/MPEGMA 4.0:1 molar ratio) and 11.6 g of mercaptopropyl-trimethoxysilane (silane/monomers molar ratio about 1/30);

by a dropping funnel, 66.2 g of a 10% w/w solution of $(NH_4)_2S_2O_8$.

The reaction is completed by adding in a single portion, 16.5 g of the same $(NH_4)_2S_2O_8$ solution.

The dry residue is of 34.3% by wt. on the total solution weight. The viscosity solution is of 250 cps. The polymer molecular weight, determined by GPC, is 10,000.

On a cement slurry prepared as described in ex. 1A the slump test with the Abrams minicone was effected; on a cement slurry prepared as described in Ex. 1E the Minislump test was carried out. The results are reported in Tables 1 and 3 respectively.

EXAMPLE 5 (COMPARATIVE)

Polymer Preparation According to Ex. 1 of EP 0 753 488, by Polymerization of Methoxypolyethylenglycol Methacrylate with Methacrylic Acid (AMA/MPEGMA 2.8/1 Ratio) by Using as Chain Transfer Agent Mercaptopropionic Acid (Prep. DIC. 57)

The equipment described in Example 2 is charged with 348.3 g of deionized water, which is heated to 80° C. as described in Example 2. In a three hours time are added:

by a metering pump, a mixture consisting of 588 g of methoxypolyethylenglycol methacrylate having M.W. 1080, 65.4 g of methacrylic acid (AMA/MPEGMA 2.8:1 molar ratio) and 3.4 g of mercaptopropionic acid (mercapto propionic/monomers molar ratio about 1/30);

by a dropping funnel, 36.0 g of a 10% w/w $(NH_4)_2S_2O_8$ solution.

The reaction is completed by adding in a single portion, 9.0 g of the same solution of $(NH_4)_2S_2O_8$ and maintaining the temperature at 80° C. for a time comprised between 30 minutes and 1 hour.

The reaction mixture, after cooling, appears as an homogeneous solution. The dry residue is 35% by wt. on the total solution weight. The viscosity is of 70 cps. The molecular weight, determined by GPC, is 21,000.

On a cement slurry prepared as described in ex. 1A the slump test with the Abrams minicone was performed; on a cement slurry prepared in the same way the compression-resistance test was performed. The results are reported in Tables 1, 2 respectively.

EXAMPLE 6

Preparation of a Polymer M.W. 16,000 by Polymerization of Methoxypolyethylenglycol Methacrylate with Methacrylic Acid (AMA/MPEGMA 2.8/1 ratio) by Using as Chain Transfer Agent a Mixture of Mercaptopropyl-trimethoxysilane (Molar Ratio to Monomers 1:50) and Calcium Hypophosphite (Molar Ratio to Monomers 1:20) (Prep. DIC. 76)

The equipment described in Example 2 is charged with 244 g of deionized water, which is heated to 80° C. as described in Example 2. In a three hours time are added:

by a metering pump, a mixture consisting of 400 g of methoxypolyethylenglycol methacrylate having M.W. 1080, 194 g of deionized water, 44.5 g of methacrylic acid (AMA/MPEGMA 2.8:1 molar ratio), 2.7 g of mercaptopropyltrimethoxysilane and 6.1 of calcium hypophosphite (M.W. 170.15) suspended in 50 g of water (silane/monomers 1/50 molar ratio); hypophosphite/monomers 1/20 molar ratio;

by a dropping funnel, 24.5 g of a 10% w/w $(NH_4)_2S_2O_8$ solution.

The reaction is completed by adding in a single portion 6.1 g of a 10% w/w $(NH_4)_2S_2O_8$ solution and then heating at 80° C. for a time comprised between 30 minutes and 1 hour.

The dry residue is of 34.7% by wt. The solution viscosity is of 75 cps. The polymer molecular weight, determined by GPC, is 16,000.

EXAMPLE 7 (COMPARATIVE)

A commercial product used as cement fluidifying additive, containing phosphorous and a polyoxyethylenic polymer having phosphonic and/or phosphinic end groups, was submitted to the Minislump test of Example 1E.

The cement was added with a polymer solution in an amount equivalent to 0.285% polymer/cement by wt. ratio. After the cone frustum removal, the slurry appeared as a semisolid conglomerate.

By increasing the polymer concentration in the slurry, even to values higher than 0.570% by weight (expressed as above), a cement slurry having a doughy consistence was obtained. In Table 4 is given the comparison with the result obtained in the same test when the cement slurry is added of the polymers of the invention (ref. ex. 3, Prep. Dic. 61).

EXAMPLE 8

Copolymer Preparation by Polymerization of Methoxypolyethylenglycol Methacrylate with Methacrylic Acid (AMA/MPEGMA Ratio 12/1) in the Presence of a Chain Transfer Agent Mercaptopropyltrimethoxysilane (Prep. DIC. 85)

The equipment described in Example 2 is charged with 365 g of deionized water. It is heated under stirring and under a nitrogen flow at a temperature in the range 80–85° C. In a three hours time are added:

by a metering pump, 325 g of an aqueous mixture at 50% in water of methoxypolyethylenglycol methacrylate of Example 2, 159.2 g of methacrylic acid (AMA/MPEGMA 12:1 molar ratio) and 11.9 g of transfer agent (transfer agent/monomer molar ratio about 1:30), by a metering pump, 85 g of a 10% w/w $(NH_4)_2S_2O_8$ solution, are introduced, by a metering pump, 123.4 g of a 30% w/w NaOH solution (corresponding to 50% by moles amount with respect to those of the acid), are introduced.

The obtained solution has a dry residue of 30% and a 85 cps viscosity.

On a cement slurry obtained as described in Example 1E the Minislump test was carried out. The results are reported in Table 3.

EXAMPLE 9

Preparation of a Copolymer Having M.W. 9,000 by Polymerization of Methoxypolyethylenglycol Methacrylate with Methacrylic Acid (AMA/MPEGMA Ratio 20/1) in the Presence of the Chain Transfer Agent Mercaptopropyltrimethoxysilane (Prep. DIC. 87)

Example 8 is repeated, by using 325 g of water, 200 g of MPEGMA having M.W. 1080, 159.2 g of AMA, 11.9 g of transfer agent. 85 g of a 10% w/w $(NH_4)_2S_2O_8$ solution and 123.4 g of a 30% NaOH solution are then fed.

The dry residue is of 30% by weight on the polymer solution weight, the viscosity solution is of 85 cps. The polymer molecular weight determined by GPC is of 9,000.

On a cement slurry obtained as described in Example 1E the Minislump test was carried out. The results are reported in Table 3.

EXAMPLE 10 (COMPARATIVE)

Preparation of a Copolymer Having M.W. 14,000 by Polymerization of Methoxypolyethylenglycol Methacrylate with Methacrylic Acid (AMA/ MPEGMA ratio 2.8/1) in the Presence of the Chain Transfer Agent Mercaptoethansulphonic Acid Sodium Salt (Prep. DIC. 94)

Example 2 is repeated, by adding 5.2 g of the sodium salt of the mercaptoethansulphonic acid instead of the silane derivative therein used (transfer agent:monomer molar ratio 1:30).

The obtained polymer solution has a dry residue of about 35%, and a viscosity of 70 cps. The polymer molecular weight determined by GPC is of 14,000.

On a cement slurry obtained as described in Example 1E the Minislump test was carried out. The results are reported in Table 3.

EXAMPLE 11

In this example minislump tests are carried out on the preparations listed in Tables 3 and 4: the minislump test for each preparation has been repeated 5 times, the figures reported represent an average value.

EXAMPLE 11 A

Minislump Test (Ex. 1E) on the Preparations Reported in Table 3

The preparations therein considered have an AMA/MPEGMA ratio varying from 2.8:1 to 20: 1. In Table 3 the results of the minislump test are reported. The data show that these preparations give to the cement slurry similar rheological properties, which are superior to those of a cement slurry containing the same quantity of a copolymer obtained by using as chain transfer agent mercaptoethansulphonic acid (Ex. 10).

EXAMPLE 12

Preparation of a Copolymer Having M.W. 19,500 by Polymerization of Methoxypolyethylenglycol Methacrylate with Methacrylic Acid (AMA/ MPEGMA Ratio 2.8/1) Using as Chain Transfer Agent a Mixture of Mercaptopropyltrimethoxysilane (Molar Ratio to Monomers 1:50) and Sodium Hypophosphite (Molar Ratio to Monomers 1:20) (Prep. DIC. 128)

In a 1 liter glass reactor, equipped as described for the reactor of Example 2, 244 g of deionized water are introduced. It is heated at 80° C. as described in Example 2. In a three hours time are added:

by means of a metering pump, an aqueous mixture formed by adding to 400 g of a 50% water solution of methoxypoly ethylenglycol methacrylate (MPEGMA) having a molecular weight (M.W.) 1080, 44.6 g of methacrylic acid (AMA) (AMA/MPEGMA 2.8:1 molar ratio) and 2.7 g of mercaptopropyltrimethoxysilane (silane/monomers molar ratio 1/50), and 3.7 g of sodium hypophosphite (phosphite/monomers molar ratio 1/20), by a metering pump, 24.5 g of a 10% (w/w) solution of ammonium persulphate $(NH_4)_2S_2O_8$.

After three hours the reaction is completed by adding, in a single portion 6.1 g of a 10% w/w $(NH_4)_2S_2O_8$ solution and maintaining the temperature at 80° C. for a time of 45 minutes. The reaction mixture, after cooling, appears as an homogeneous solution. The solution has a dry residue of 35% and a viscosity of 80 cps. The polymer molecular weight, determined by GPC, is of 19,500.

On a cement slurry prepared as in Ex. 1E, the Minislump test was carried out at a 2 hours interval, i.e. after 2, 4, 6 and 8 hours from the cement slurry preparation, by taking aliquots in a suitable quantity for performing the test. The results are reported in Table 5. In the column on the left of the Table is given the % polymer/cement on a dry weight basis. The data of Table 5 demonstrate that the polymers obtained by polymerization in the presence of the mixture of chain transfer agents according to the invention, when added to a cement slurry allow to maintain the starting rheological properties of the slurry over a long time, i.e. 4–6 hours from the slurry preparation.

EXAMPLE 13 (COMPARATIVE)

Preparation of a Copolymer by Polymerization of Methoxypolyethylenglycol Methacrylate with Methacrylic Acid (AMA/MPEGMA Ratio 2.8/1) Using as Chain Transfer Agent Sodium Hypophosphite in a Molar Ratio to Monomers 1:20 (Prep. DIC. 129)

Example 12 is repeated omitting the addition of the silane compound. The solution containing the obtained polymer has a viscosity of 2.325 cps (determined according to ex. 1C, by lowering the spindle speed of rotation to 12 rpm). The average molecular weight of the polymer is 92,000. The slurry obtained does not exhibit fluidity: the slump test according to ex. 1E provides a cake having a diameter of 10 cm.

The example demonstrates that when hypophosphite alone is used as chain transfer agent in the polymerizing solution of Ex. 12, the resulting polymers are ineffective as cement fluidifying additives.

EXAMPLE 14 (COMPARATIVE)

Preparation of a Copolymer Having M.W. 27,000 by Polymerization of Methoxypolyethylenglycol Methacrylate with Methacrylic Acid (AMA/ MPEGMA Ratio 2.8/1) Using as Chain Transfer Agent Mercaptopropyl-trimethoxysilane (Molar Ratio to Monomers 1:50) (Prep. DIC. 130)

Example 12 is repeated omitting addition of the hypophosphite salt. The solution containing the obtained polymer has a viscosity of 100 cps. The average molecular weight of the polymer is 27,000.

On a cement slurry prepared as in Ex. 1E, the Minislump test was carried out at a 2 hours interval, i.e. after 2, 4, 6 and 8 hours from the cement slurry preparation, by taking aliquots in a suitable quantity for performing the test. The results are reported in Table 5 and demonstrate that the polymers obtained by polymerization in the presence of mercaptopropyl-trimethoxysilane, used as fluidizing agents of a cement slurry, maintain the starting rheological properties of said slurry over a long time, although the effectiveness of said polymers is inferior to that of the polymers of Ex. 12.

EXAMPLE 15 (COMPARATIVE)

Preparation of a Copolymer Having M.W. 14,500 by Polymerization of Methoxypolyethylenglycol Methacrylate with Methacrylic acid (AMA/MPEGMA Ratio 2.8/1) Using as Chain Transfer Agent a Mixture of Mercaptopropionic Acid (Molar Ratio to Monomers 1:50) and Sodium Hypophosphite (Molar Ratio to Monomers 1:20) (Prep. DIC. 131)

Example 12 is repeated by substituting the silane compound, with a same amount, on a molar basis, of mercaptopropionic acid. The solution containing the obtained polymer has a viscosity of 75 cps.

On a cement slurry prepared as in Ex. 1E, the Minislump test was carried out at a 2 hours interval, i.e. after 2, 4, 6 and 8 hours from the cement slurry preparation, by taking aliquots in a suitable quantity for performing the test. The results are reported in Table 5 and demonstrate that the polymers obtained by polymerization in the presence of the mixture of the above said chain transfer agents are less effective, as cement fluidizing additives, than those obtained in Ex. 12.

EXAMPLE 16

Preparation of a Polymer by Polymerization of Methoxypolyethylenglycol Methacrylate (MPEGMA) with Methacrylic Acid (AMA) and 2-Acrylamido-2-methyl Propanesulfonic Acid (AMPS) (AMPS/AMA/MPEGMA Molar Ratio 0.5/2.3/1) and Mercaptopropyl-trimetoxysilane as Chain Transfer Agent (Prep. DIC. 172)

In a 1 liter glass reactor, with heating jacket connected to a thermostatic bath, equipped witht thermocouple, stirrer, metering pump, dropping funnel, pipe for the nitrogen flow and condenser, 260 g of deionized water are introduced and heated under nitrogen flow up to a temperature of 80–85° C. After reaching this temperature (three hours), are added:

by means of a metering pump, an aqueous mixture formed by adding to 400 g of a 50% water solution of methoxypoly ethylenglycol methacrylate (MPEGMA) mol. weight (M.W.) 1080, 36.6 g of methacrylic acid (AMA) (AMA/MPEGMA 2.3:1 molar ratio), 19.2 g of AMPS M.W. 207 (AMPS/MPEGMA 0.5:1) and 3.7 g of mercaptopropyl-trimethoxysilane (silane/monomers 1/32 molar ratio), by means of a metering pump, 24.5 g of a 10% (w/w) solution of ammonium persulphate $(NH_4)_2S_2O_8$.

After elapsing three hours, while maintaining the reaction mixture under stirring at the temperature of 80° C., 6.1 g of a 10% w/w $(NH_4)_2S_2O_8$ solution are added in a single portion and the reaction is carried out for further 45 minutes. The reaction mixture, after cooling, appears as an homogeneous solution. The solution has a dry residue of 35% by weight and viscosity of 70 cps. On an aliquot the minislump test according to ex. 1E is carried out and the results are shown in Table 3.

EXAMPLE 17 (COMPARATIVE)

Preparation of a Polymer Containing in the Chain Silanol Groups, Obtained by Polymerization of Methoxypolyethylenglycol Methacrylate (MPEGMA) with Methacrylic Acid (AMA) and Methacryloyloxypropyltrimethoxysilane (Silquest® A174) (MPEGMA/AMA/Silquest® A174 Molar Ratio 1/2.5/0.21) and Sodium Hypophosphite as Chain Transfer Agent (Prep. DIC. 183)

In a 1 liter glass reactor, with heating jacket connected to a thermostatic bath, equipped witht thermocouple, stirrer, metering pump, dropping funnel, pipe for the nitrogen flow and condenser, 372 g of deionized water are introduced and heated under nitrogen flow up to a temperature of 80–85° C. After reaching this temperature (three hours), are added:

by means of a metering pump, an aqueous mixture formed by adding to 400 g of a 50% water solution of methoxypoly ethylenglycol methacrylate (MPEGMA) mol. weight (M.W.) 1080, 39.8 g of methacrylic acid (AMA) (AMA/MPEGMA 2.5:1 molar ratio), 9.7 g of Silquest® A174 M.W. 248 (Silquest® A174/MPEGMA 0.21:1 as molar ratio), 11 g of sodium hypophosphite $NaH_2PO_2.H_2O$ ($NaH_2PO_2.H_2O$/monomers 1:6.8 as molar ratio), by means of a metering pump, 30.0 g of a 10% (w/w) solution of ammonium persulphate $(NH_4)_2S_2O_8$.

After three hours the reaction is ended. The reaction mixture, after cooling, appears as gel. The solution has a dry residue of 30% by weight. Viscosity was very high and could not be determined with the spindle used in Ex. 1C. The thus obtained polymer was tested according to Ex. 1E (minislump test). During the preparation it was observed that the formulation was not enough wetted by the quantity of water added according to the recipe. Thus it was not obtained a paste suitable for the minislump test, that could not be carried out.

EXAMPLE 18 (COMPARATIVE)

Preparation of a Polymer Containing in the Chain and at the Chain Ends Silanol Groups, Obtained by Polymerization of Methoxypolyethylenglycol Methacrylate (MPEGMA) with Methacrylic Acid (AMA) and Methacryloyloxypropyltrimethoxy Silane (Silquest® A174) (MPEGMA/AMA/Silquest® A174 Molar Ratio 1/2.5/0.21) and Mercaptopropyl-trimetoxysilane as Chain Transfer Agent (DIC 184)

In a 1 liter glass reactor, with heating jacket connected to a thermostatic bath, equipped witht thermocouple, stirrer, metering pump, dropping funnel, pipe for the nitrogen flow and condenser, 372 g of deionized water are introduced and heated under nitrogen flow up to a temperature of 80–85° C. After reaching this temperature (three hours), are added:

by means of a metering pump, an aqueous mixture formed by adding to 400 g of a 50% water solution of methoxypoly ethylenglycol methacrylate (MPEGMA) mol. weight (M.W.) 1080, 39.8 g of methacrylic acid (AMA) (AMA/MPEGMA 2.5:1 molar ratio), 9.7 g of Silquest® A174 M.W. 248 (Silquest® A174/MPEGMA 0.21:1 as molar ratio) and 4.18 g of mercaptopropyl-trimethoxysilane (silane/monomers 1/33 molar ratio), by means of a metering pump, 30.0 g of a 10% (w/w) solution of ammonium persulphate $(NH_4)_2S_2O_8$.

After three hours the reaction is ended. The reaction mixture, after cooling, appears as a thick, homogeneous solution. The solution has a dry residue of 30% by weight and viscosity of 2750 cps. On an aliquot the minislump test according to ex. 1E is carried out. The results have the following ones:

t=0: 17 cm t=30 minutes: 16 cm

The experiments under ex. 17 and ex. 18 demonstrate that:

A) Silanol groups grafted in the copolymer chain are ineffective for obtaining polymers endowed with cement fluidifying properties.

B) If in the copolymer there are instead present silanol groups both grafted in the backbone and at the chain ends, said polymer exhibits cement fluidifying properties, although much lower in comparison with those given by the copolymers of the invention.

The above demonstrates also that in the copolymers of the invention the silanol groups are positioned at the chain ends.

EXAMPLE 19

Demonstration that the Polymers of the Invention Contain Silicon Atoms (Silanol Groups) at the Chain Ends In a 1 liter glass reactor, with heating jacket connected to a thermostatic bath, equipped witht thermocouple, stirrer, metering pump, dropping funnel, pipe for the nitrogen flow and condenser, 245 g of deionized water are introduced and heated under nitrogen flow up to a temperature of 80–85° C. After reaching this temperature, in the time of three hours, are added:

by means of a metering pump, an aqueous mixture formed by adding to 400 g of a 50% water solution of methoxypoly ethylenglycol methacrylate (MPEGMA) mol. weight (M.W.) 1080, 44.5 g of methacrylic acid (AMA) (AMA/MPEGMA 2.8:1 molar ratio) and 9.16 g of mercaptopropyl-trimethoxysilane (molar ratio silane/monomers 1/15), by a metering pump, 24.5 g of a 10% (w/w) solution of ammonium persulphate $(NH_4)_2S_2O_8$.

After three hours, the reaction is completed by adding, in a single portion 6.1 g of a 10% w/w $(NH_4)_2S_2O_8$ solution and maintaining the temperature at 80° C. for about 1 hour. The reaction mixture, after cooling, appears as an homogeneous solution. The solution has a dry residue of 35% by weight and viscosity of 55 cps.

An aliquot of said solution was dialyzed in a tube made with a membrane Spectra/Por® 3 having mol. wt. cut-off of 3500. Dialysis was made against deionized water. When the conductivity of the deionized water used for dialysis did not change any more, the purification was over. On a sample of the solution of the retentate it was determined the dry residue, that corresponded to a concentration of 2.68% wt./wt.

The sample was then analyzed by Flame Atomic Absorption (flame: $N_2O$-acetylene) using a calibration between 10 and 50 mg/l (silicon). The silicon content found in the assayed sample was of 150 ppm (value corrected for the silicon content of the blank).

A blank was run by following the same procedure above given for the reaction but with the following modifications: water: 241 g; mercaptopropionic acid (instead of mercaptopropyl-trimethoxysilane): 4.9 g. The blank was the dialyzed and analyzed as said above. The silicon found in said sample was below the detection limits (<5 ppm). Calculations were as it follows.

Since the concentration wt./wt. of silicon on the overall reactants mass (729 g) is of 1795 ppm for a dry content of 35%, for a concentration of 2.68% as found in the retentate the theoretical concentration of silicon amounts at 137 ppm.

Said value compares well with the experimental figure above given. This affords to say that all the silicon added has reacted with the polymer.

EXAMPLE 20

Preparation of a Copolymer by Polymerization of Maleic Acid Methoxypolyethylenglycol Monoester with Acrylic Acid (Molar Ratio Ester/Acrylic Acid 2.8:1) and Mercaptopropyl-trimetoxysilane as Chain Transfer Agent In a 1 liter glass reactor, with heating jacket connected to a thermostatic bath, equipped witht thermocouple, stirrer, metering pump, dropping funnel, tubing for the nitrogen flow and a condenser, 150 g of deionized water and 10 g of a 0.15% solution of $FeSO_4.7H_2O$ are introduced and heated under nitrogen flow up to a temperature of 80° C. After reaching this temperature, in the time of three hours, are added:

by means of a metering pump, an aqueous mixture of 150 g of maleic acid methoxypolyethylenglycol monoester 1000, 150 g of deionized water; 27.5 g of acrylic acid, 2 g of mercaptopropyl-trimethoxysilane (molar ratio ester/acrylic acid=2.8:1).

by a metering pump, 22.6 g of a 10% (w/w) solution of ammonium persulphate $(NH_4)_2S_2O_8$.

After three hours, the reaction is completed by adding, in a single portion 10 g of a 10% w/w $(NH_4)_2S_2O_8$ solution and maintaining the temperature at 80° C. for about 2 hour. The reaction mixture, after cooling, appears as an homogeneous solution. The solution has a dry residue of 35%.

TABLE 1

Change with time (up to two hours from the preparation) of the rheology (test ex. 1A) of samples of cement added of the polymers of the invention and of the polymer of ex. 5 (comparative). R indicates the % polymer/cement

|  | $H_2O$/CEM* (%) | $t_o$ | 30' | 60' | 90' | 120' (C) | $t_o$ - C | $C/t_o$ (%) |
|---|---|---|---|---|---|---|---|---|
| cement without additives R% = 0,175 | 0.719 | 254 | 232 | 213 | 210 | 188 | 66 | 74 |
| DIC 61 (Ex. 3) | 0.569 | 272 | 238 | 225 | 207 | 200 | 72 | 73.5 |
| DIC 57 (Ex. 5) Comp. | 0.601 | 270 | 220 | 207 | 198 | 196 | 74 | 72.6 |
| DIC 60 (Ex. 4) | 0.655 | 253 | 217 | 217 | 208 | 205 | 48 | 81.0 |

$H_2O$/CEM = w/w ratio water/cement;

TABLE 2

Resistance to compression (MPa) of cement added of a quantity of polymer to give the herein below reported ratio w/w dry basis. Determinations had been carried out after one day and after 7 days.

|  | ratio w/w %:0.175% | | ratio w/w %:0.350% | | ratio w/w %:0.5% | |
|---|---|---|---|---|---|---|
| Sample | after 1 day | after 7 days | after 1 day | after 7 days | after 1 day | after 7 days |
| untreated cement | 9.96 | 22.73 | 9.96 | 22.73 | 9.96 | 22.73 |
| DIC 54 (Ex. 2) | 13.66 | 39.83 | 9.33 | 39.39 | — | 51.52 |
| DIC 61 (Ex. 3) | 11.19 | 37.98 | 10.73 | 41.34 | — | 51.73 |
| DIC 57 (Ex. 5) comp. | 11.02 | 37.52 | 7.81 | 38.64 | — | 48.78 |

TABLE 3

Minislump Test (Ex. 1E) made on cement added of the same quantity of AMA/MPEGMA copolymers having different molar ratios AMA/MPEGMA

| Sample polymer prep. | ratio polym./cem. dry wt. | AMA/MPEGMA | t = 0 (cm) | t = 30' (cm) |
|---|---|---|---|---|
| DIC 54 (Ex. 2) | 0.175 | 2.8:1 | 20 | 20 |
| DIC 60 (Ex. 4) | 0.175 | 4:1 | 20 | 20 |
| DIC 85 (Ex. 8) | 0.350 | 12:1 | 20 | 20 |
| DIC 87 (Ex. 9) | 0.350 | 20:1 | 20 | 20 |
| DIC 172 (Ex. 16) | 0.350 | 2.3:1 | 20 | 19.5 |
| DIC 94 (Ex. 10) (comp.) | 0.350 | 2.8:1 | 18.5 | 16.5 |

TABLE 4

Minislump Test (Ex. 1E) made on a cement slurry added of the same quantity of AMA/MPEGMA copolymers

| Sample polymer prep. | ratio w/w % polymer cement | t = 0 (cm) | t = 30 min. (cm) |
|---|---|---|---|
| DIC 61 (Ex. 3) | 0.350 | 21 | 20 |
| Ex. 7 (comp.) | 0.350 | semisolid paste | semisolid paste |

TABLE 5

Demonstration of the synergism on the cement fluidizing properties of the acrylic polymers according to the invention, obtained by using the chain transfer agent mixture silane + inorganic P^(I–III) compounds. In the first column on the left decimal fractions % are polymer/cement % on a dry weight basis

| | hours from the preparation of the cement slurry | | | | |
|---|---|---|---|---|---|
| | t = 0 | 2 | 4 | 6 | 8 |
| DIC 128 (Ex. 12) | | | | | |
| 0.175% | 19.5 | 19.5 | 19.5 | 19.0 | 18.0 |
| 0.350% | 20.0 | 20.0 | 20.0 | 18.5 | 18.0 |
| DIC 130 (Ex. 14) (comp.) | | | | | |
| 0.350% | 20.0 | 20.0 | 18.5 | 18.0 | 16.0 |
| DIC 131 (Ex. 15) (comp.) | | | | | |
| 0.175% | 19.0 | 18.5 | 18.0 | 16.5 | 16.0 |

What is claimed is:

1. Hydrosoluble acrylic copolymers, having weight average molecular weight in the range 5,000–80,000, determined as the value corresponding to the maximum of the elution peak (GPC determination), containing in the molecule the following repeating units:

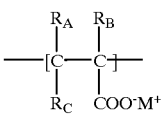

(I)

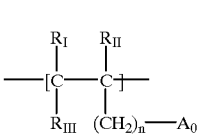

(II)

wherein:
the molar ratio between the unit (I) and unit (II) in the polymer ranges from 1:1 to 50:1;
in unit (I) $R_A$, $R_B$, $R_C$, equal or different, are H or $CH_3$; $M^+$ is H or a cation belonging to the IA, IIA group, or ammonium;
in unit (II) $R_I$, $R_{II}$, equal or different, are H or $CH_3$; n is an integer from 0 to 2, $A_0$ is $-COO-(R_TO)_m-R_Z$ wherein $R_T$ is a saturated alkyl group having from two to four carbon atoms, m is an integer from 7 to 50, $R_Z$ is an hydrogen atom or a saturated alkyl group from 1 to 4 carbon atoms;
$R_{III}$ is H, COOH, $COO^-M^+$ wherein $M^+$ is as above defined or $A_0$ as above defined;
optionally containing from 0 to 20%, on the total monomer weight, of repeating units from one or more of the following monomers:
(meth)acrylic ester of $C_1$–$C_{20}$ aliphatic alcohols;
polyethoxymonoallyl alkylethers of formula $CH_2=CHCH_2O(C_2H_4O)_p-R$ wherein p is comprised between 5 and 50 and R is $C_1$–$C_4$ alkyl;
aliphatic $C_3$–$C_5$ monounsaturated sulfonic acids;
compounds of formula

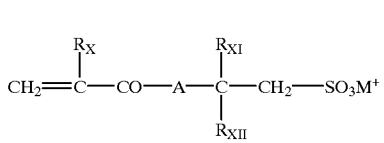

(V)

wherein:
$M^+$ is as above defined,
$R_X$ is H or $CH_3$,
$R_{XI}$ and $R_{XII}$ are, independently each from the other H or $C_1$–$C_8$ alkyl,
A is NH or N—$CH_3$;
said hydrosoluble acrylic polymers contain at the chain ends silanol groups and are obtainable by copolymerizing the monomers in the presence of chain transfer agents selected from the following:

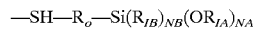  (A), wherein
$R_{IA}$ is hydrogen or a saturated $C_1$–$C_3$ alkyl, $R_{IB}$ is $C_1$–$C_3$ alkyl, NB is an integer and is zero or 1, NA is an integer and is 2 or 3, with the condition that NA+NB=3, $R_o$ is a linear or branched alkylenic chain, containing a number nx of carbon atoms from 1 to 20, optionally containing polar groups bound to the chain directly, or through $(CH_2)_{nx}$ groups, wherein n has the above indicated meaning;

a mixture made from compound (A) as above defined with phosphorous$^{I-III}$ inorganic acid/s or its/their salts, (compound (B)), wherein the phosphorous has an oxidation number varying from I to III (phosphorous$^{I-III}$), the cations of the salts of phosphorous$^{I-III}$ inorganic acids are alkaline, earth-alkaline metals or ammonium ions.

2. Acrylic copolymers according to claim 1, wherein the polar groups in $R_o$ of compound (A) bound to the chain directly or by $(CH_2)_n$ bridges are —COOH groups or the corresponding alkaline metal salts; —COO—$(R_TO)_m$—$R_Z$ in which $R_T$, m, $R_Z$ have the above mentioned meaning; —O—$(R_TO)_m$—$R_Z$; —N($R_{Z'}$)$R_Z$ wherein $R_{Z'}$, equal or different from $R_Z$, has the same meaning of $R_Z$; —CO—N($R_{Z'}$)$R_Z$; —SO$_3$H or its alkaline metal salts.

3. Acrylic copolymers according to claim 1, wherein the compound (A) is SH—CH$_2$—CH$_2$—CH$_2$—Si(OR$_{IA}$)$_3$ wherein $R_{IA}$ is as above defined.

4. Acrylic copolymers according to claim 1 having weight average molecular weight, as defined above, in the range 8,000–50,000 and a molar ratio between the unit (I) and unit (II) in the range 2:1–20:1.

5. Acrylic copolymers according to claim 1 having in the unit (I) $R_A$=$R_C$=H, $R_B$=H, CH$_3$; in the unit (II) $R_I$=H, $R_{II}$=H, CH$_3$, $R_{III}$=H n=0; in $A_0$ $R_T$=saturated alkyl group with two or three carbon atoms; m is in the range 10–45; $R_Z$=CH$_3$.

6. Process for preparing acrylic polymers of claim 1, wherein the polymerization occurs in water and is carried out batchwise, or in a semicontinuous, or continuous way, by using initiators soluble in water, in the presence of polymerization accelerators and of chain transfer agents selected among the compounds of formula (A), or mixtures of said compounds with compounds (B).

7. Process according to claim 6 wherein the compounds of formula (A) are used in molar ratios to the polymer monomers in the range 1:5–1:80, when mixtures of chain transfer agents (A) and (B) are used, the molar ratios to the monomers of each of the chain transfer agent in the mixture of (A)+(B) vary within the following limits, from: (A) 1:5 and (B) 1:40 to: (A) 1:80 and (B) 1:2.5.

8. Process according to claim 6 wherein the acid carboxylic groups of the chain are neutralized with alkali, partially or totally, and the alkaline agent can be added at the beginning, or during, or at the end of the polymerization reaction.

9. Process according to claim 6 wherein the polymerization is carried out at temperatures in the range 50–120° C.

10. Process according to claim 6 wherein a water aliquot is poured into the reactor before adding the reactants, which are co-fed under stirring, under constant flow, and separately the initiator and optionally the alkali solution are added.

11. Compositions formed by slurries comprising cement aqueous mixtures and the copolymers according to claim 1, containing a copolymer amount, expressed as percentage by weight on the cement dry, in the range 0.05–20%.

12. Compositions according to claim 11 containing de-aerating, antifoaming, thickening agents, retardants and inert materials.

13. A method for reducing the viscosity of an aqueous cement slurry comprising adding thereto a hydrosoluble acrylic copolymer having weight average molecular weight in the range 5,000–80,000, determined as the value corresponding to the maximum of the elution peak (GPC determination), containing in the molecule the following repeating units;

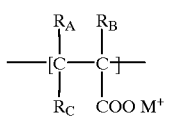

(I)

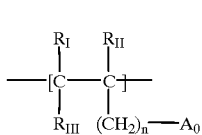

(II)

wherein:
the molar ratio between the unit (I) and unit (II) in the polymer ranges from 1:1 to 50:1;
in unit (I) $R_A$, $R_B$, $R_C$, equal or different, are H or CH$_3$; M$^+$ is H or a cation belonging to the IA, IIA group, or ammonium;
in unit (II) $R_I$, $R_{II}$, equal or different, are H or CH$_3$; n is an integer from 0 to 2, $A_0$ is —COO—$(R_TO)_m$—$R_Z$ wherein $R_T$ is a saturated alkyl group having from two to four carbon atoms, m is an integer from 7 to 50, $R_Z$ is an hydrogen atom or a saturated alkyl group from 1 to 4 carbon atoms;
$R_{III}$ is H, COOH, COO M$^+$ wherein M$^+$ is as above defined above defined or $A_0$ as above defined;
optionally containing from 0 to 20%, on the total monomer weight of repeating units from one or more of the following monomers:
(meth)acrylic ester of C$_1$–C$_{20}$ aliphatic alcohols;
polyethoxymonoallyl alkylethers of formula CH$_2$=CHCH$_2$O(C$_2$H$_4$O)$_p$—R wherein p is comprised between 5 and 50 and R is C$_1$–C$_4$ alky;
aliphatic C$_3$–C$_5$ monounsaturated sulfonic acids;
compounds of formula

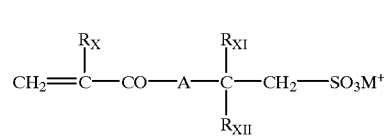

(V)

wherein:
M$^+$ is as above defined,
$R_X$ is H or CH$_3$,
$R_{XI}$ and $R_{XII}$ are, independently each from the other H or C$_1$–C$_8$ alkyl,
A is NH or N—CH$_3$;
said hydrosoluble acrylic polymers contain at the chain ends silanol groups and are obtainable by copolymerizing the monomers in the presence of chain transfer agents selected from the following:

(A), wherein
$R_{IA}$ is hydrogen or a saturated C$_1$–C$_3$ alkyl, $R_{IB}$ is C$_1$–C$_3$ alkyl, NB is an integer and is zero or 1, NA is an integer and is 2 or 3, with the condition that NA plus NB=3, $R_o$ is a linear or branched alkylenic chain, containing a number nx of carbon atoms from 1 to 20, optionally containing polar groups bound to the chain directly, or through $(CH_2)_{nx}$ groups, wherein n has the above indicated meaning;

a mixture made from compound (A) as above defined with phosphorous$^{I-III}$ inorganic acid/s or its/their salts, compound (B)), wherein the phosphorous has an oxidation number varying from I to III (phosphorous$^{I-III}$), the cations of the salts of phosphorous$^{I-III}$ inorganic acids are alkaline, earth-alkaline metals or ammonium ions.

14. The method of claim 13, wherein said phosphorous inorganic acid is selected from $H_2PO_2$ or $H_2PO_3$ or mixtures thereof.

15. The copolymers of claim 1, wherein said phosphorous inorganic acid is selected from $H_2PO_2$ or $H_2PO_3$ or mixtures thereof.

* * * * *